United States Patent

Legal, Jr.

[15] 3,649,175
[45] Mar. 14, 1972

[54] TREATMENT OF PHOSPHORIC ACID, PROCESS, APPARATUS AND PRODUCT

[72] Inventor: Casimer C. Legal, Jr., Baltimore, Md.
[73] Assignee: W. R. Grace & Co., New York, N.Y.
[22] Filed: Oct. 20, 1966
[21] Appl. No.: 588,034

Related U.S. Application Data

[63] Continuation-in-part of Ser. No. 355,908, Mar. 30, 1964, abandoned, Continuation-in-part of Ser. No. 483,742, Aug. 30, 1965, abandoned.

[52] U.S. Cl. ........................................23/107, 71/34, 71/43, 23/165
[51] Int. Cl. ................C01b 25/28, C01b 25/38, C01b 25/22
[58] Field of Search .........................................71/34; 23/107

[56] References Cited

UNITED STATES PATENTS

| | | | |
|---|---|---|---|
| 3,464,808 | 9/1969 | Kearns | 71/34 |
| 3,375,063 | 3/1968 | Bookey et al. | 23/107 |

*Primary Examiner*—Oscar R. Vertiz
*Assistant Examiner*—Gregory A. Heller
*Attorney*—Edward J. Hanson and Kenneth E. Prince

[57] ABSTRACT

A process for preparing an ammonium polyphosphate product which involves heating an aqueous solution of phosphoric acid to a temperature of about 200°–400° F., combining the acid with ammonia under autogenous reaction conditions to produce ammonium phosphate-polyphosphate reaction mixture having a temperature of about 350°–600° F., and subsequently cooling the reaction mixture by rapid dehydration thereof.

6 Claims, 3 Drawing Figures

TREATMENT OF PHOSPHORIC ACID, PROCESS, APPARATUS AND PRODUCT

This is a continuation-in-part of my copending applications, Ser. No. 355,908, filed Mar. 30, 1964 now abandoned and Ser. No. 483,742, filed Aug. 30, 1965, now abandoned.

This invention is directed to preparing ammonium phosphate solid and liquid products by reacting phosphoric acid and ammonia and to the stabilization of liquid phosphoric acid.

It is an object of this invention to provide a simple and inexpensive process for preparing ammonium phosphates. It is an additional object to provide such a process whereby orthophosphoric acid can be ammoniated directly to produce very desirable ammonium phosphate products. It is a still further object to provide such a process that will provide a new and improved dehydrated product having a high percentage of its phosphate in plant-available form.

It is an additional object of this invention to provide an economical process for the stabilization of wet process phosphoric acid, whereby metallic ions and other ions are not removed from the acid, but are dissolved and suspended indefinitely in the acid and whereby when precipitates do form the precipitates are soft.

It is a still further object to provide an economical process for preparing a solid ammonium phosphate from wet process phosphoric acid whereby metallic ions and other ions are not removed from the acid and the product yielded has an exceptionally high percentage of its phosphate in plant-available form.

Another object of this invention is to provide a new and improved solid ammonium phosphate product containing a high percentage of the phosphate in polyphosphate form and Fe, Al, Ca and F compounds and having an extremely high percentage of its phosphate in citrate-soluble form. It is another object of this invention to provide a new and improved solid ammonium phosphate product containing a high percentage of the phosphate in polyphosphate form and Fe, Al, Ca and F compounds and having a high percentage of its phosphate in water soluble forms. It is a still further object of this invention to provide a liquid ammonium orthophosphate from wet process phosphoric acid that is highly resistant to precipitation, a liquid phosphoric acid with an unusually soft precipitate that is pumpable and easily redispersed upon stirring, a liquid ammonium orthophosphate containing Fe, Al, Ca and F compounds and having a high percentage of its phosphate in citrate-soluble form, and a liquid orthophosphoric acid relatively free of ferric iron and containing a substantial quantity of ferrous iron.

A still further object of this invention is to provide specialized apparatus suitable for the very expeditous production of liquid orthophosphoric acid containing ammonium orthophosphate, liquid orthophosphoric acid containing the impurities present in wet process orthophosphoric acid and containing ammonia and having an unusually high percentage of its phosphate in citrate-soluble form, liquid orthophosphoric acid that is resistant to precipitation, liquid orthophosphoric acid relatively free of ferric iron and containing a substantial quantity of ferrous iron, and ammonium phosphate solids having their phosphorus in exceptionally high citrate-soluble forms, and ammonium phosphate solids having their phosphorus in high water-soluble amounts by the direct ammoniation of wet process orthophosphoric acid.

In summary, a solid ammonium phosphate is produced by reacting phosphoric acid and ammonia. In one preferred form of the process for producing this solid ammonium phosphate, the phosphoric acid is preheated before it is reacted with the ammonia. The preheated phosphoric acid is mixed with ammonia and an exothermic reaction is brought about between the phosphoric acid and ammonia. The temperature of the reaction mixture is raised above the boiling point of the mixture and the reaction mixture is dehydrated.

In a prefered embodiment for producing a solid ammonium phosphate the phosphoric acid is preheated to about 200°–400° F. The temperature is raised to about 350° to 600° F. by means of the heat of reaction from the reaction of the ammonia and the phosphoric acid without the introduction of additional external heat. More preferably, it has been found desirable to preheat to 230°–350° F. and raise the temperature by utilizing the heat of reaction to 450°–550° F.

Ammonium polyphosphate salts are formed directly from orthophosphoric acid and ammonia without the intermediate step of concentrating the orthophosphoric acid to a super acid level. In another aspect it has been found preferable to conduct the reaction under super atmospheric pressure, preferably under a hydrostatic head, and dehydrate at atmospheric pressure.

Preferably, the hydrostatic head is at least about 10 p.s.i. The melt produced by the reaction is preferably churned while it is solidifying. When the solid ammonium phosphate is to be granulated, a preferred procedure is to churn the molten mass to work and granulate the mass simultaneously. It is more preferable to churn the mass into a batch of recycled product granules in a continuous system.

In another of its aspects this invention in one preferred form is directed to the rapid dehydration cooling of the ammonium phosphate product substantially immediately after the reaction of the ammonia and phosphoric acid. In a more preferred embodiment the mass is further cooled substantially immediately after the dehydration cooling thereof by adding the mass while still molten to a quantity of relatively cool granulated product, the quantity of granulated product being substantially greater than the quantity of the melt, preferably on the order of at least about 2–3 times the quantity of the melt on a weight basis. The two materials are churned vigorously together to enhance an equilibrium temperature between them. It is also desirable to cool the granules yielded by the churning procedure to normal ambient temperature as quickly as possible. The ammonium phosphate should be cooled below 350° F. within 10 minutes after ammoniation occured, preferably within 5 and when possible 3 minutes and more preferably below 250° F. within 10 minutes after ammoniating preferably within and when possible 3 minutes.

The solid ammonium phosphate product produced has a composition of 6–17 percent nitrogen and 50–65 percent phosphorus, expressed as $P_2O_5$, of the total phosphates from 5–65 percent are polyphosphates and more than 99 percent are citrate-soluble $P_2O_5$ and more usually more than 99.5 percent citrate-soluble $P_2O_5$ and more preferably more than 99.7 percent and 99.9 percent citrate-soluble $P_2O_5$. This solid product has an Fe, Al, CA and F content of at least 3 percent on a weight basis.

In another aspect of this invention, in one preferred form, a new combination of apparatus is provided having in series, a phosphoric acid source, a pump, an acid heater and a pipeline; in converging series an ammonia source, an ammonia vaporizer and a pipeline; a reaction pipeline, a hydrostatic pressure maintenance pipe, a flash chamber, a pug mixer, screens, a surge hopper, and a cooler, and in a preferred form in diverging series from the flash tank, pug mixer and cooler, an off-gas scrubber. In addition, in a preferable arrangement, a flow recorder and controller is positioned between the pump and the acid heater and another flow recorder and controller is positioned between the ammonia vaporizer and the pipeline with a ratio controller between them. A pressure controller is positioned between the ammonia vaporizer and the flow recorder and controller. Temperature recorders are positioned between the acid heater and the pipeline, the pressure controller and the flow recorder and controller, in the hydrostatic pressure maintenance pipe, and in the feed outline from the flash chamber.

In summary, a wet process liquid ammonium orthophosphoric acid is prepared by adding ammonia to orthophosphoric acid. In one preferred form of the process for producing this wet processs orthophosphoric acid, the acid is preheated before it is reacted with the ammonia. After preheating, the phosphoric acid and ammonia are mixed together and an exothermic reaction brought about between them. The temperature of the reaction mixture is raised above the boiling point of the mixture and the reaction mixture is then dehydrated.

In a preferred embodiment the phosphoric acid is preheated to about 200°–350° F. The temperature is raised to about 400°–500° F. by means of the heat of reaction from the reaction of the ammonia and the phosphoric acid without the introduction of external heat. More preferably it has been found desirable to preheat to 230°–375° F. and raise the temperature by utilizing the heat of the reaction to 450°–550° F. In another aspect it has been found preferable to conduct the reaction under a hydrostatic head or equivalent pressure and flash at atmospheric pressure. Preferably, the hydrostatic head is at least about 10 pounds. By another aspect the hot ammonium phosphate liquid product is rapidly cooled shortly after ammoniation, preferably to below 350° F. in 3 minutes and preferably below 250° F. in 5 minutes more preferably in 3 minutes.

In a second aspect, in one preferred form, the valence of the iron (Fe) in the wet process phosphoric acid is adjusted to stabilize the liquid wet process phosphoric acid against precipitation of a hard precipitate.

In another preferred embodiment the wet process phosphoric acid is both ammoniated and adjusted as to iron valence to achieve a synergistic stabilization of the wet process phosphoric acid against precipitation.

In another aspect of this invention, in one preferred form, a stable wet process orthophosphoric acid liquid product is provided having its impurities substantially indefinitely dispersed therein. These impurities are predominately in solution rather than suspension. The phosphoric acid product has a nitrogen content of from about 1 to 6 percent, more preferably 2 to 4 percent.

In a still further aspect of this invention, in a preferred form, a stable wet process orthophosphoric acid liquid product is provided having its impurities substantially indefinitely and stably dispersed therein and an effective amount of Fe with a valence adjusted to the ferrous form.

In a further aspect of this invention, in one preferred form, a stable wet process orthophosphoric acid liquid product is provided having its impurities substantially indefinitely and stably dispersed therein, a nitrogen content of from about 1 to 6 percent (more preferably 2 to 4 percent) and an effective amount of Fe with a valence of 2.

By another aspect of this invention, in one preferred form, a new combination of apparatus is provided wherein a continuous acid flow-conducting means is provided with a pump for continuously moving the acid through the apparatus. The first section of the conducting means is a preheating section with an ammoniating section located downstream from the preheating section. The apparatus has an evaporation section located downstream from the ammoniating section and pressure providing means to maintain sufficient pressure to bring about a substantially complete reaction of the ammonia and phosphoric acid in only a short reaction distance within a short time period. The apparatus has a cooling section downstream from the pressure providing means for rapidly cooling the ammoniated product within a short time after ammoniation.

Phosphorus content is to be understood to be calculated on the basis of $P_2O_5$ throughout this application even though the actual chemical compositions may be of different forms.

Further aspects of the present invention will become apparent hereinafter and the specification concludes with claims particularly pointing out and distinctly claiming the subject matter that I regard as my invention. The invention, however, as to organization and method of operation together with other objects and advantages, can best be understood by reference to the following description when taken in conjunction with the accompanying drawings.

Figure 1:
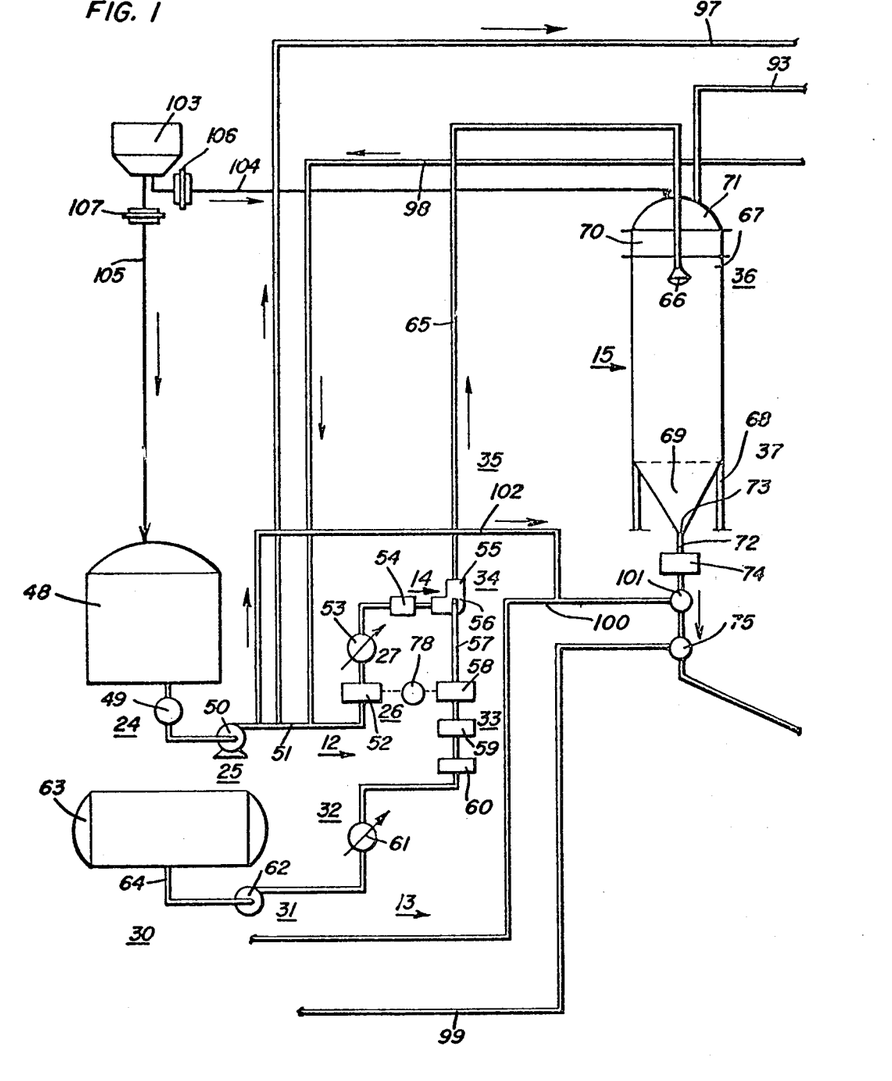
FIG. 1 is a diagrammatic representation of apparatus suitable for producing the solid ammonium phosphate product thereof.
Figure 1A:
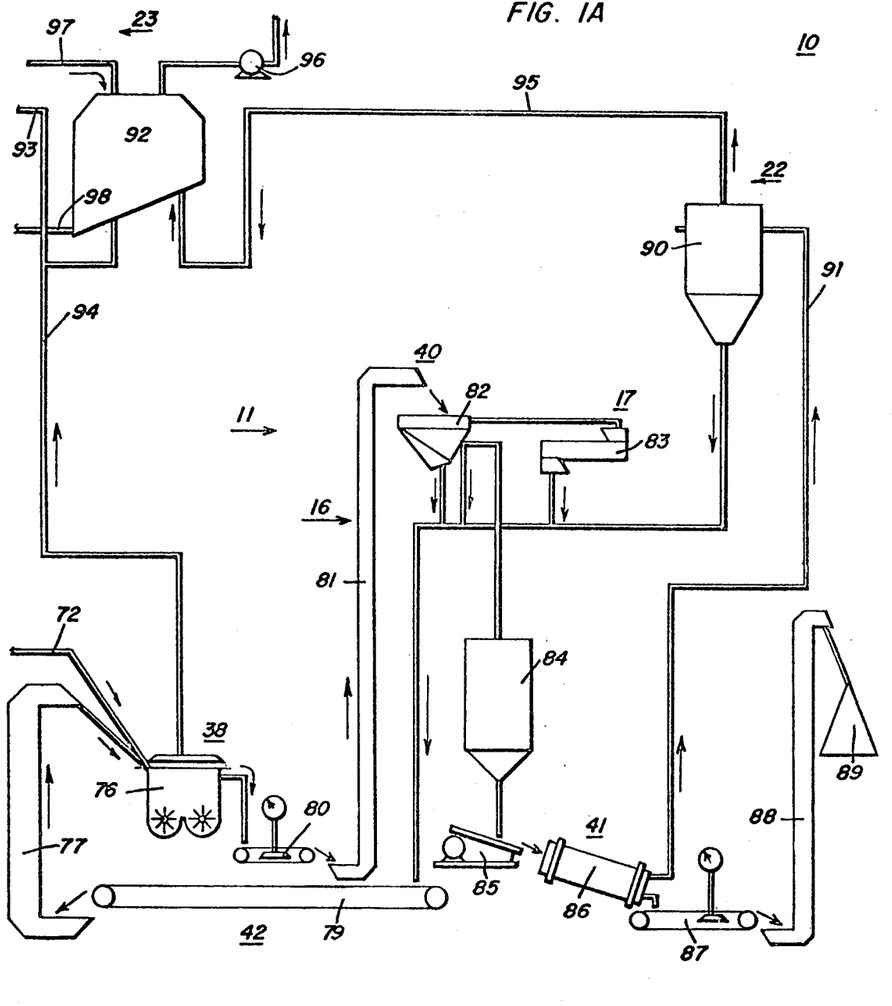

Referring now to FIG. 1 of the drawing, I have shown therein an apparatus 10 which embodies my invention in one form thereof. The apparatus 10 may be seen to have as its basic component a continuous flow-conducting means 11 which includes an acid preparation section 12, an ammonia preparation section 13, a reaction section 14, a dehydration section 15, and a granulation section 16. Several auxiliary systems may be seen to be associated with the flow-conducting means 11. An oversize crushing means 17, a dust-collecting system 22 and a scrubber system 23 are included in the auxiliary systems shown in FIG. 1.

The phosphoric acid preparation section 12 of the flow-conducting means 11 may be seen to include a phosphoric acid feed in section 24, a propelling section 25, a phosphoric acid input control section 26 and a preheating section 27. The ammonia preparation portion 13 of the continuous flow-conducting means 11 includes an ammonia feed in section 30, a metering section 31, a vaporizing section 32 and an ammonia input control section 33. The reaction section 14 includes an ammoniation section 34 and a hydraulic section 35. The dehydration section 15 includes a water removal section 36 and a collection section 37. The granulation section includes a granule-forming section 38, a sizing section 40, a cooling section 41, and the recycle section 42.

Phosphoric acid is stored in a feed tank 48 from which it flows by gravity through the valve 49 in the feed in section 24 to the pump 50 of the propelling section 25. The pump 50 forces the acid through piping 51, a flow recorder and controller 52, acid heater 53 and the temperature recorder 54 into the elbow 55 of the ammoniation section 34.

An ammonia addition nozzle 56 extends into the flow path of the phosphoric acid through elbow 55. The ammonia nozzle feeds the ammonia to the acid at the point of its greatest turbulence in negotiating the elbow. This assures a good mixing and thorough contacting of the ammonia with the acid as it flows through the elbow. The ammonia nozzle is connected to an ammonia feed tube 57 which extends out of the elbow 55 and through a flow recorder and controller 58, a temperature recorder 59, a pressure controller 60, an ammonia vaporizer 61, to the ammonia flow meter 62. Liquid anhydrous ammonia is fed by the vapor pressure of the ammonia itself from the nurse tank 63 through feed tube 64 of the feed in section 30 of the flow meter 62. A ratio controller 78 regulates the phosphoric acid flow controller 52 and the ammonia flow controller 58.

Piping 65 extends from the elbow 55 to a nozzle 66 in the dehydration chamber 67. The dehydration chamber serves to allow flashing, evaporation and moleculer dehydration as well as separation of liquid and gaseous phases all of which have broadly been termed dehydration in this application. The dehydration chamber 67 is at the top of a tower 68. The nozzle 66 sprays the ammoniated phosphoric acid through an airgap in the dehydration chamber to a catch bowl 69. The dehydration chamber 67 has an outlet opening 70 through an upper portion below top 71 to allow the water vapor to escape from the dehydration chamber. This opening also provides the dehydration chamber with a substantially atmospheric pressure condition. Piping 72 is connected to the feed out opening 73 in the catch bowl 69 and feeds dehydrated ammoniated acid from the bowl past a temperature recorder 74 and through a valve 75. The ammoniated phosphoric acid is a molten material above about 350° F. when ammoniated above about a 6 percent nitrogen weight content.

When the molten material is fed into the pug mixer 76 through the piping 72 a bucket elevator conveyor 77 simultaneously feeds a volume of recycled fine granules into the pug mixer. The volume of recycled fine granules is substantially greater than the volume of the melt flowing into the pug mixer. The pug mixer has the capability of churning the fine granules and the melt together to equalize their temperature and work the mass, keeping the mass in a substantially granular condition. The pug mixer discharges onto a weigh belt 80. The weigh belt enables the output to be checked at this point. From the weigh belt 80 the material is transferred to a conveyor 81 which elevates the material to a plurality of screens 82 for sizing to fines, oversize and product size. The oversize materials are shunted to a mill 83 where they are crushed and delivered to conveyor 79 where they are combined with the fines also being delivered simultaneously to conveyor 79 directly from the screens. The conveyor 84 feeds the bucket conveyor 77 which delivers the fines into the pug mixer as recycle. When sufficient fines and oversize material are not available some of the product may also be delivered to conveyor 79 and recycled.

The balance of the product flows by gravity through the product sized screen into a surge hopper 84 and from the surge hopper onto a vibrator 85 which feeds them to a tumbler cooler 86 which tumbles the granules in air and thereby lowers their temperature to substantially the ambient temperature level. From the cooler the granules go to weigh belt 87 to establish the yield being transferred to storage. From the weigh belt 87 the product granules are transferred by a bucket elevator 88 to a granule storage pile 89. It may be seen from the foregoing discussion that the dehydration chamber, pug mixer and cooler, together with their connecting apparatus function as a cooling mechanism.

At times it is desirable to incorporate a dust-elimination system and an ammonia scrubber or recovery system into apparatus 10. Referring once again to FIG. 1 one arrangement incorporating these auxiliary systems into the indicator has been diagrammatically represented. Looking first at the cyclone dust system 22, the cyclone dust reducer 90 may be seen connected by duct work 91 to the cooler 86. The dust or fines which settle in the cyclone separator may be fed to the recycle on the belt 79.

The scrubber 23 is also shown in FIG. 1. The scrubber has a tower 92 which is connected to the dehydration chamber 67 by ducts 93, to the pug mixer 76 by ducts 94 and to the cyclone-dust system 22 by ducts 95. When the scrubber is used in connection with the dehydration tank 67 it is usual to close the dehydration tank to the atmosphere by the elimination of the opening 70 and to remove the steam through fans 96 which draw air from the scrubber and pass it out through a stack (not shown). When a scrubber is used it may be connected to only the dehydration chamber 67 but it is preferable to connect the scrubber to the pug mixer 76 and the cyclone separator 90 because they may also emit a small amount of ammonia vapor. When a scrubbing system is used, water can serve as the scrubbing medium in the conventional manner with the liquid passing downwardly in the tower and the gas upwardly.

In a preferred scrubbing arrangement, however, a small portion of the phosphoric acid in piping 51 can be shunted through piping 97 to the top of the scrubbing tower 92. The phosphoric acid supplied to the top of the scrubber tower is sprayed out in sufficient volume to substantially remove the ammonia from the gases which are passed upwardly in the tower. Phosphoric acid is more efficient than water because it absorbs the ammonia not only by taking it into solution but also be reacting with it. The weight of the ammonia absorbed is such a small amount that the percentage of the ammonia added to the phosphoric acid that passes through the acid heater 53 is relatively inconsequential, less than 0.5 percent in the usual instance. When phosphoric acid is used in the scrubber it is of course too expensive to be discarded, such as the water might be. Therefore, the phosphoric acid is delivered back to the greater volume of phosphoric acid passing through the piping 51. Piping 98 takes the phosphoric acid from the bottom of scrubbing tower 92 and delivers it to piping 51 upstream from the acid heater 53.

A modification can be provided in the apparatus 10 that will enable the liquid melt flowing from the dehydration chamber 67 to be transferred directly into drums or other disposition means without going to the granulation section 16. This modification can be seen in FIG. 1 in the form of conduit 99. The valve 75 would then be of a type that could shunt the flow or a portion of the flow into conduit 99.

In practicing the process, in a preferred form, to produce a granulated ammonium phosphate product, a wet process phosphoric acid having a $P_2O_5$ concentration of about 52 to 54 percent and a water content in excess of 12 percent is heated to a temperature in the range of about 200°–350° F. It is preferable to carry this initial preheating to 230°–350° F. and when possible usually as close to the upper limit as practicable. For operation at super atmospheric conditions as in Examples 8–11 it is often preferable to preheat to 400° F. and raise the temperature by the heat of reaction toward 600° F. Vaporized ammonia is introduced concurrently into the stream of the preheated phosphoric acid. The ammonia and phosphoric acid are combined in a weight ratio of $N:P_2O_5$ of about 6–15:50–65. The preferred range of the combination is 10–15:56–65, $N:P_2O_5$. As the ammonia comes into contact with the phosphoric acid an exothermic reaction is brought about which raises the temperature of the reaction mixture to about 400°–550° F. and more preferably to 450°–550° F. It has been found preferable to bring about the reaction under pressure of from about 1 to 60 p.s.i. and a range of 10–40 p.s.i. is usually the more practicable and preferred range. It has been observed that the efficiency is enhanced when the reaction is conducted under hydrostatic pressure resulting in a relatively complete reaction of the phosphoric acid and ammonia within a short period of time to provide a substantially stable ammonium phosphate product.

Cooling is achieved immediately after the completion of the reaction by dehydrating the 400°–550° F. reaction mixture. Dehydration has been observed to result in a temperature drop of about 100° F. to a temperature of about 300°–450° F. within seconds and dehydrates a portion of the ammonium phosphate molecules. It will be recalled that the reaction mixture solidifies at about 350° F. Therefore, care must be taken in the usual instance that the dehydration does not lower the temperature below about 350° F. until the reaction mixture has been processed to substantially its final physical form. In the usual instance premature solidification is prevented by assuring that the temperature of the reaction mixture fed into the dehydration chamber exceeds 450° F. by a sufficient margin to assure that the temperature does not drop below the 350° F. level with the 100° drop in temperature produced by the dehydration. Generally, the ammonia loss encountered in dehydrating the reaction mixture has been found to be less than 5 percent. Most of the material passing off in a gaseous state in the dehydration operation has been found to be steam. The ammonia and the phosphate values remain predominately as a liquid melt.

In the usual instance when a granulated ammonia phosphate product is desired the liquid melt from the dehydration operation is churned to beat and flail the material into particles while working the material to produce a granular product. It is preferable to churn the melt into a mass of recycled fines that is 2 to 3 times greater on a weight basis. The recycled fines not only serve as nuclei over which the phosphoric acid or ammonium phosphate melt can be spread but rapidly cool the melt as it is sprayed over the fines by equalization of the temperature between the fines and the melt.

The temperature of the granules should be brought below 350° F. within a short time, generally less than 5 minutes after ammoniation to produce a product having maximum citrate soluble characteristics. More preferably, the temperature should be brought below 350° F. within 5 minutes after ammoniation and below 250° F. within 3 minutes after ammoniation to maximize citrate solubility.

It is, of course, possible to allow the melt from the flash chamber to solidify and then crush the solid material if a granular product is desired.

While wet process merchants grade phosphoric acid having a $P_2O_5$ content of 52 to 54 percent $P_2O_5$ and anhydrous ammonia have been used in practicing the process of this invention, it will be obvious to those skilled in the art that other phosphoric acids and ammonias could be employed therein.

By the process of this invention a new solid ammonium phosphate product has been provided. This product has been found to be substantially stable and nonhygroscopic in a granular solid form. The granules were highly soluble and easily dispersed in water. The reaction of the ammonia with the phosphoric acid has been found to be substantially complete. No decomposition of the ammonium phosphates has been observed.

The process has been found to be of particular utility in providing ammonium phosphate products from wet process phosphoric acid because the orthophosphate of the wet process acid of merchant grade (52–54 percent $P_2O_5$ acid) can be directly converted to ammonium polyphosphates in amounts of from 5 to 65 percent of the phosphates in the final product, without the requirement of intermediate phosphoric acid concentration procedures to produce a super acid first. Of great significance is the fact that the process yields a product from the impure phosphoric acid having as much as 99 percent of its phosphate content in citrate soluble phosphate form, and as much as 90 percent of its phosphate in water-soluble form. It is of particular importance in the fertilizer industry to have the phosphates in citrate soluble form because citrate insoluble phosphates are not considered to be plant available and are thus generally considered to have no value when the analysis of a fertilizer is computed. Water soluble phosphates are generally considered to be citrate soluble and plant available.

Solid ammonium phosphate products can be produced having an Fe, Al, Ca and F content of more than 3 percent on a weight basis and often about 6 percent, a nitrogen content of about 6 to 17 percent on a weight basis, a phosphorus content of about 50–65 percent on a weight $P_2O_5$ basis, with from about 35 to 65 percent of the phosphorus in polyphosphate form, about 99 percent in citrate-soluble form and 90 percent in water-soluble form. The product has been found in certain instances to have a nitrogen content from about 10 to 15 percent, a phosphorus content from about 56 to 65 percent, with from about 45 to 55 percent of the phosphorus in polyphosphate from, 99.06–99.72 percent citrate-soluble form and 91.2–91.1 percent in water-soluble form.

The equipment previously described, and shown diagramatically in FIG. 1, is also adaptable to making a liquid ammoniated phosphoric acid product in accordance with this invention. To produce such a product the rate of ammoniation is reduced so that the nitrogen content of the final product will not exceed about 6 percent. It is, of course, obvious to those skilled in the art that a lower grade phosphoric acid with a greater water content than the merchants grade acid might permit a higher rate of ammoniation to be employed commensurate with producing a liquid product.

Looking once again at FIG. 1, the liquid product removal conduit 100 may be seen connected to piping 73 below the outlet opening 72. Valve 101 controls the flow to conduit 100 from piping 73. The piping 100 extends to a storage area or some other suitable disposition facility (not shown). An additional acid supply line 102 may be seen extending from piping 51 downstream from the pump 50 to supply the raw acid to pipeline 100 when it is found desirable to dilute or adjust the phosphorus to nitrogen ratio thereof. With the modifications described above the apparatus 10 can be used in the production of solid and liquid ammonium phosphate products.

This invention also provides an efficient process for treating wet process phosphoric acid to produce a liquid ammonium-phosphoric acid product that contains substantially the same percent $P_2O_5$ concentration after dilution with ammonia as before dilution and often a higher $P_2O_5$ concentration after dilution with ammonia than before the ammonia addition.

In using the process of this invention, in a preferred form, a wet process phosphoric acid is heated to a temperature in the range of about 200°–350° F. and ammonia is added to the heated acid in the weight ratio of N:$P_2O_5$ of about 1–6:35–65, more preferably a ratio of 2–4:51–57. It is preferable to carry the initial preheating to 250°–350° F. and when possible usually as close to the upper limit as practicable. For operation at super atmospheric conditions as in Examples 7–10 it is often preferable to preheat to 400° F. and raise the temperature by the heat of reaction toward 600° F.

Pressure is maintained on the acid solution during the heating and ammoniation phases of the process. The pressure is preferably maintained at about 1–60 p.s.i. and a range of from 10–40 p.s.i. is preferred. Sufficient heat is imparted to the solution during the preheating and ammoniation phases of the process to bring the solution above its normal boiling temperature by the end of the ammoniation phase. The normal boiling temperature for a 3–54 (nitrogen-phosphorus) acid is approximately 340° F. at sea level. After ammoniation the pressure is released and the gaseous phase is separated from the liquid phase. The physical change in state of the water during evaporation and the separation of the gaseous and liquid phases rapidly cools the phosphoric acid and dehydrates or concentrates it. The dehydrated acid is then additionally cooled after which it may be transferred to shipping containers, storage, or fed into other processing equipment for further processing. The dehydration usually cools the acid to the extent of producing a temperature drop of about 100° F. The acid is usually cooled to below 350° F. within 3 minutes.

In Examples 4–6 of this specification the process was carried out at an ambient temperature of about 60°–80° F. Of course, the temperature at some plant sites could be below freezing, 32° F. In fact, the temperature could be so low as to require that the raw phosphoric acid be heated to maintain a free-flowing fluid state and the process could still be carried out to advantage. Naturally, if the ambient temperature is very low the heating and cooling capacities of the equipment to be used would need to be adjusted to obtain the same temperature ranges obtained under ambient temperatures of 60°–80° F. Adjustments in heating and cooling capacities would also be required if the equipment were to be used under extremely hot ambient temperature conditions. Similarly, adjustment would have to be made if the equipment were to be used at high altitudes where the boiling point of wet process phosphoric acid would be lower. In the latter case the permissible temperatures of operation might be lower.

One variation in the process that comes readily to mind is the use of a vacuum flash or dehydration chamber. In some situations, it might be more advantageous to operate at lower temperatures and flash or dehydrate the treated solution to achieve rapid evaporation by lowering the boiling point through the use of a vacuum. The temperature of the phosphoric acid would be maintained below the normal boiling point of the acid during the ammoniation phase of the process. After ammoniation the acid would be subjected to a subatmospheric pressure that would provide a boiling point below the temperature of the acid to bring about a flashing of the acid. Vacuum flashing could also be used to effect higher efficiency in water evaporation and cooling using the procedure in which the temperature of the phosphoric acid is raised above its normal boiling point but maintained under pressure as previously described.

In one instance when the process of this invention was operated in a manner that produced a phosphoric acid at the end of the dehydration phase having a higher $P_2O_5$ concentration than the original untreated acid, an 0–52.5 (N–$P_2O_5$) phosphoric acid was heated to about 300° F. and then ammoniated to slightly above a 3.7 percent nitrogen content with anhydrous ammonia. Sufficient pressure was maintained on the solution during ammoniation to prevent boiling. The phosphoric acid was then sprayed into a dehydration chamber where it was dehydrated yielding a 3.7–56.3 nitrogen-phosphoric acid solution. It can be seen that this was about 4 percent increase in the $P_2O_5$ concentration.

In a very desirable form of the invention whereby a liquid phosphoric acid is stabilized against precipitation the acid is both ammoniated and treated to reduce the valence of the iron. The ammonia and valence adjusted iron exhibit a synergistic relationship. In a preferred operation the process proceeds substantially as discussed previously with respect to the ammoniation of the wet process phosphoric acid with the exception that an effective amount of valence reducing agent is provided in the dehydration chamber. In experimental work this amount has been found to be adequately supplied by the internal walls of a 36-cubic-foot mild steel flash tank when the production volume is about that of Example 4. If the quantity of material being fed into the dehydration chamber is of such magnitude that the mild steel exposed in the surface area of the walls is not sufficient to reduce the valence of the iron in the phosphoric acid by an effective amount, mild steel iron plates could be installed in the flash tank to provide greater surface areas.

By this invention when the phosphoric acid was ammoniated and treated with a material, such as mild steel, a new liquid wet process phosphoric acid was provided that was found to be stable against precipitation in excess of 2 percent (actually observed to be less than 1 percent) by weight at temperatures of from 0° F. to 180° F. for periods of 2 months while containing substantially all the impurities that were in the original wet process acid. The quantity of Fe, Al, Ca and F may constitute more than 3 percent of the product weight and often above 6 percent of the products weight. The small amount of precipitate that sometimes forms has been found to be soft and easily redispersed by stirring. More than 90 percent of the impurities were found to be in solution and substantially all of the other impurities were in indefinite suspension. The pH of the phosphoric acid was less than 1, and in fact did not appear to exceed 1 at anytime during processing. The viscosity of the product is such that it is fluid and free-flowing. The above described characteristics are all found in the liquid wet process phosphoric acid of this invention having a nitrogen content of from about 2–4 percent by weight and an effective amount of the iron originally in the ferric form converted to the ferrous form. A substantial portion of the iron and preferably substantially all of the iron in the original acid is in the ferrous form. They are generally found in the liquid wet process phosphoric acid of this invention having nitrogen contents of from about 1–6 percent by weight and an effective amount of the iron originally present in the ferric form converted to the ferrous form.

When the nitrogen content of the liquid phosphoric acid of this invention was at about 3 percent by weight these characteristics appeared to be at a generally optimal level. As the nitrogen content dropped below about 3 percent by weight the amount of precipitation increased somewhat. As the nitrogen content rose above about 3 percent by weight the viscosity increased. The optimal nitrogen content range has been found to be about 2.9–3.7 percent by weight. With higher nitrogen concentrations the viscosity goes up rather sharply as the nitrogen concentration increases. It is believed that the characteristics of the liquid phosphoric acid would still be good even if only 75 percent of the impurities were in solution and the pH was as high as 2. The nitrogen-phosphoric liquid product contains from 0.5 to 8 percent $NH_4$ ions by weight, and from 35–65 percent $P_2O_5$ phosphorus value by weight and substantially all of the iron in ferrous form.

In practicing the invention in another preferred form, to stabilize wet process phosphoric acid against precipitation of hard precipitates the valence of the iron contained in the phosphoric acid is adjusted from the ferric to the ferrous form without ammoniation. This can be done by holding the liquid wet process phosphoric acid in a container, preferably under agitated conditions, and adding a valence reducing agent thereto in an effective amount. The mixture of wet process phosphoric acid and valence reducing agent is preferably continuously agitated until an effective portion of the iron having the ferric form is reduced to ferrous iron. A suitable reducing agent is elemental iron in the form of iron filings. It has generally been found that for every 2 parts of the ferric iron present, 1 part of elemental iron is sufficient to effectively bring about the desired valence adjustment. Other valence reducing agents appear to be equally effective. Hydrazine sulfate has been used successfully in place of the iron in an experimental procedure such as the Fe example given in Example 3.

It may be in certain instances that treatment with mild steel or an iron material may be effective to stabilize the wet process phosphoric acid against the formation of hard precipitates without an actual material change in valence. This may, in certain instances, be true when the phosphoric acid is used with ammonia to obtain stabilization against precipitation. The exact mechanism of operation is not understood.

The apparatus of FIG. 1 is adaptable to modification so that a reducing agent can be directly added and dispersed in the phosphoric acid. Such a modification is diagramatically represented in FIG. 1 wherein a hopper 103 and feed lines 104 and 105 with gates 106 and 107 respectively are shown. The feed line 105 is adapted to feed a reducing agent such as iron fillings to the raw phosphoric acid in the storage tank 48. The feedline 104 is adapted to feed the reducing agent into the dehydration chamber 67 through its top 71. The gates 106 and 107 control the flow of the reducing agent through the respective feed lines. In the usual situation the reducing agent is fed into the apparatus 10 at only a single point. It has been found preferable to add the reducing agent in the dehydration chamber.

By this invention a new wet process phosphoric acid liquid has been provided wherein the valence of the iron present therein has been adjusted from the ferric to the ferrous form in a portion sufficient to effectively stabilize the acid against the formation of any substantial amount of hard precipitation for a relatively long period of time.

Figure 2:
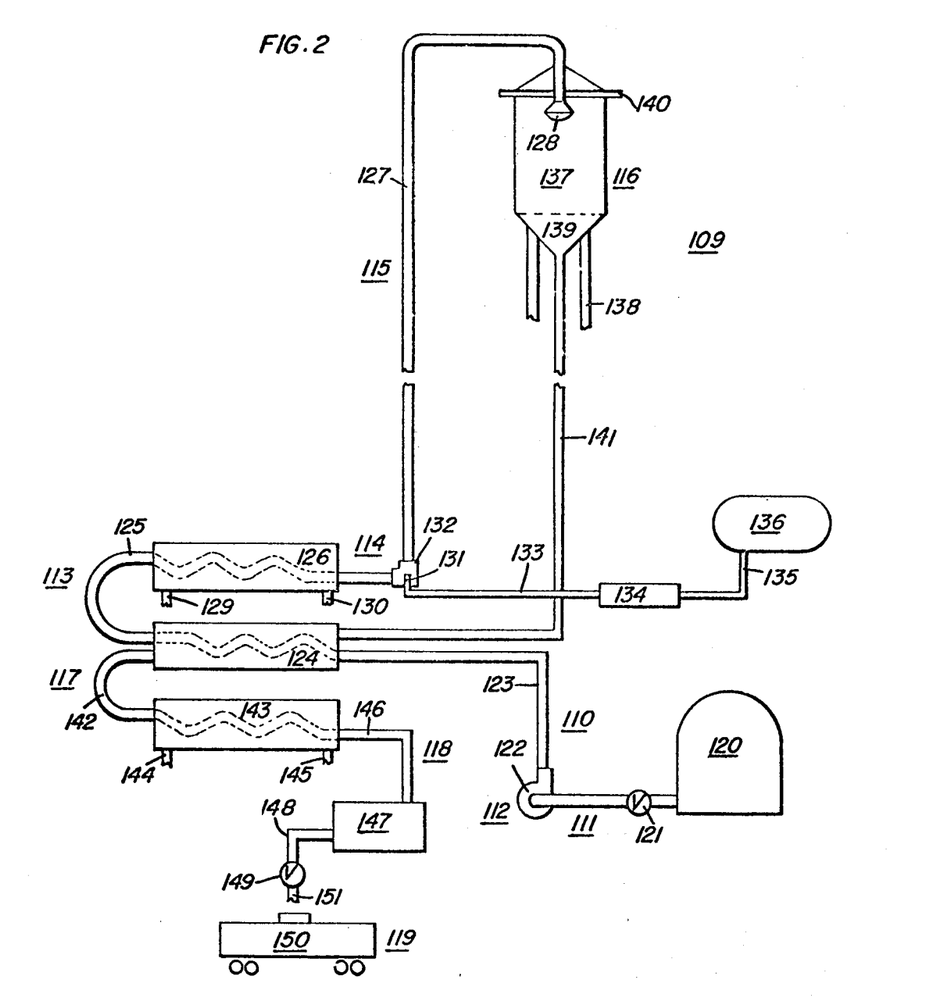
FIG. 2 is a diagrammatic representation of apparatus of this invention for producing the stabilized orthophosphoric acid liquid product thereof.

The apparatus of FIG. 2 may advantageously be used in many instances in treating wet process phosphoric acid to provide an ammoniated liquid product relatively stable against precipitation.

Referring to FIG. 2 the apparatus 109 of this invention may be seen diagramatically in a preferred embodiment thereof. The apparatus 109 includes a continuous acid flow conducting means 110, a feed in section 111, a propelling section 112, a preheating section 113, an ammoniation section 114, a hydraulic pressure-creating section 115, a dehydration section 116, a cooling section 117, a feed out section 118 and a container 119. Raw acid is stored in a feed tank 120 from which it flows by gravity through the valve 121 in the feed in section 111 to the pump 122 of the propelling section 112. The pump 122 forces the acid through piping 123 to the heat exchanger 124 and then through hose 125, heater 126, piping 127 to the spray nozzle 128. The heat exchanger 124 and the heater 126 together form the preheating section 113 of the apparatus. The heater is shown connected to a steam input pipe 129 which may be supplied from any appropriate steam source. An outlet pipe 130 for the cooled steam or condensation is shown at the other end of the heater. Of course, other heating means such as an electric resistance coil could be substituted for the steam heater.

An ammonia addition nozzle 131 extends into the flow path of the phosphoric acid through elbow 132. The ammonia nozzle feeds the ammonia into the acid at the point of its greatest turbulence in negotiating the elbow. The ammonia nozzle is connected to an ammonia feed tube 133 which extends out of the elbow 132 to an ammonia vaporizer 134. Liquid anhydrous ammonia is fed by the vapor pressure of the ammonia itself through piping 135 from nurse tank 136 to the vaporizer.

The spray nozzle 128 is positioned in a dehydration chamber 137 at the top of a tower 138 and sprays the ammoniated phosphoric acid through an airgap to catch bowl 139. The dehydration chamber 137 has an opening 140 through an upper portion to allow the water vapor given up during the flash evaporation to escape from the flash chamber. Piping 141 is connected to the feed out opening in the catch bowl 130 and feeds the reconcentrated ammoniated acid solution from the bowl to the heat exchanger 124. This is a gravity feed. Hose 142 feeds the reconcentrated ammoniated acid solution from the heat exchanger to the cooler 143. The heat exchanger 124 and the cooler 143 together form the cooling portion 117 of the apparatus 109. The cooler 143 has a cool water inlet 144 which may come from any source of cool water, such as a well (not shown). A water outlet 145 is connected to the other end of the cooler and may discharge into a sewer. Of course, the water can be cooled and recirculated.

Piping 146 feeds the cooled acid from the cooler 143 to a collection tank 147. Piping 148 which includes a control valve 149 feeds the cooled acid directly into a shipping container 119 which is an insulated railroad car 150. Noninsulated railroad tank cars can also be used and, of course, the outlet 151 could be at a storage tank or least directly into another system for further processing the acid.

It would be obvious to those skilled in the art that the apparatus 109 may be modified to provide a mild steel dehydration chamber 137 or means for adjusting the valence of the iron from ferric to ferrous in the same manner as previously described with respect to the apparatus 10.

In employing the above described equipment the following specific parts have been successfully used. Of course, other equivalent parts could be substituted. Teflon hose and teflon-lined piping; a heat exchanger, a heater and a cooler fabricated from carbate; a 316 stainless steel dehydration chamber; a 30-gallon-per-minute pump; a standard steam heat exchange ammonia vaporizer; and a standard bullet shaped ammonia supply tank (nurse tank) were used. The storage tanks were made from mild steel and they were rubber lined. The insulated railroad tank car was polyvinyl chloride plastic lined. An uninsulated railroad car that was also used war rubber lined. The hydrostatic pressure creating section 115 of piping 127 extended 32 feet above the elbow 132. Other specific parts used successfully include a mild steel dehydration chamber, a jacketed stainless steel weight tank for raw phosphoric acid, a variable speed pump, ammonia weigh cylinders, an ammonia rotameter, a tube pipe nozzle sized to give the ammonia vapor sonic gas velocities, a tube pipe nozzle for phosphoric acid, a Schedule 40 type 316 stainless steel 1 ½ inch by 41.5 ft. long ammoniation section, a 6-inch long by ½-inch pipe nozzle in the dehydration chamber, and a 1 ½-inch steel pipe exiting from the dehydration chamber.

Various modifications are possible in the procedures to achieve a wider application of this invention. For example, in addition to the trace element Fe, which has known agricultural value, other trace elements might be added to the flash chamber or directly into the pug mixer for inclusion in the product. When desired other materials such as potassium chloride could be added to the materials being fed into the pug mixer to obtain, for example, what is called a complete fertilizer material, a fertilizer having a nitrogen, phosphorus and potash content.

The process of this invention for producing both the solid and liquid ammonium phosphate products was carried out in a laboratory reaction bomb. The bomb was the usual stainless steel commercially available type having a closed pressure resistant cylinder with a pressure gauge, an adjustable pressure regulator, a pressure release means, stirring mechanism, two inlets, and an outlet. The first inlet was provided with a cutoff valve, while the second inlet was provided with a cutoff valve and a flow regulator. The outlet was provided with a back pressure relief valve. The closed cylinder was provided with a heating mantle, however, other heating means, e.g., heat exchanger tubes or electrical resistance heaters inserted into or wrapped around the cylinder or direct heating of the cylinder could be used. The rate of addition of ammonia to the acid was critical in using this equipment. If the ammonia was added too rapidly, the reaction became violent, and the reactants tended to boil off through the back pressure relief valve. It was found that the ammonia could be added at a rate of 0.05–1.5 pound moles per minute per 500 pounds of wet process phosphoric acid, although a rate of 0.1–1.0 pound moles per minute per 500 pounds of acid was found preferable.

The total amount of ammonia added was also important, both with respect to the nature of the product and with respect to efficient operation of the process. If the $N:P_2O_5$ weight ratio exceeds about 1:10, a solid product was obtained. Below this ratio the product was liquid. The operable $N:P_2O_5$ weight ratio is about 1:6.4–16 with wet process acid and about 1:5–16 with furnace acid. It was found necessary to have an $N:P_2O_5$ ratio of at least about 1:16 if the heat produced by the reaction between the ammonia and the acid was to be sufficient to vaporize the desired quantity of water. Above a 1:5 weight ratio, some of the ammonia was lost from the reaction via the pressure relief valve, thereby rendering the process more costly.

Using the reaction bomb, in a preferred embodiment, wet process orthophosphoric acid is heated to a temperature in the range of about 250°–400° F., under pressure sufficient to prevent boiling, and ammonia is added to the thus heated acid in the weight ratio of $N:P_2O_5$ of about 1:6.4–16 and at the rate of about 0.1–1.0 pound moles of ammonia per minute per 500 pounds of acid, and the product is recovered.

The temperature of the acid before the ammonia addition should be chosen so that using the preferred pressure conditions, the acid does not foam out the back pressure relief valve, i.e., the back pressure gauge is set so that the reaction bomb contains the heated acid below its boiling point. The preferred temperature range is 240°–255° F. at the preferred pressure range of about 10–30 p.s.i.g. However, pressures of 5–75 p.s.i.g. are operable. Under these conditions, original acid temperature is 230° to 320° F. A defoaming agent, e.g., sodium salt of a sulfonic acid e.g., sodium dodecyl benzene sulfonate or the like, can be used in small quantities to prevent acid foaming, 0.2–1.0 parts by weight of said salt was operable in my experiments and 0.5 parts by weight was preferable per 500 parts by weight 54 percent acid.

It has been found that liquid ammoniated phosphatic products prepared by this process in the reaction bomb from wet process phosphoric acid were stable and that precipitates did not form even when the products were retained in storage for periods of about 3–10 weeks or longer at temperatures of about 40°–115° F. The solid ammonium phosphate products had analysis as high as 9–56 ($N—P_2O_5$) when made from wet process acid.

The total phosphate and the percent of the total phosphate that is polyphosphate are to be understood for purposes of this specification and the claims to be as determined according to the analytical procedure described below. This procedure is based on the analytical procedure set forth in *Methods of Analysis AOAC*, 10th edition, 1965, procedure 2.028.

Starting with a solid phosphate material (including a liquid containing solid material) an alkaline decomposition is employed. A 1.0-gram sample is taken and ground to pass a 40-mesh screen. This ground sample is placed in a 100-ml. breaker and 50 ml. of water is added. The breaker is placed in a petri dish and ice is packed around it. The dish is placed on a magnetic stirrer and the stirring bar is positioned in the beaker. After stirring has begun one gram of sodium peroxide is added over a 5 minute period in approximately 0.1-gram portions and stirring is continued until the reaction ceases. The solution is then filtered through a rapid filter into a 250-ml. volumetric flask and the residue on the paper is washed 10 times to insure the separation of the phosphorus from the residue. After dilution to volume and mixing, an aliquot containing not more than 25 mg. ortho $P_2O_5$ is taken for an orthophosphate content determination. If the phosphate is already in solution the dilution is made directly and then the aliquot may be taken.

The aliquot is placed in a flask and analyzed immediately by the alkalimetric ammonium molybdophosphate method. The procedure is carried out while the aliquot is at approximately room temperature. Initially methyl orange or methyl red is added to the aliquot as an indicator. Then the aliquot is neutralized by titrating nitric acid (1–10) into it until the indicator responds. 50 ml. of 20 percent ammonium nitrate is then added. After this, ammonium hydroxide is added until the solution becomes slightly alkylene. The indicator in the solution is used to determine alkylinity. Next the solution is again rendered slightly acid with nitric acid (1+10). The indicator in the solution is used to determine acidity. After this add 75 ml. of acidified molybdate solution. The acidified molybdate is made in accordance with procedure 2.026 (b) *Methods of Analysis* 10th edition. The solution is agitated for 30 minutes after the addition of the acidified molybdate. This completely precipitates the orthophosphate portion of the solution. At the end of the agitation period the flask is immediately decanted through a filter; the precipitate is washed twice by decantation with 25-30 ml. portions of water, agitating thoroughly and allowing the mixture to settle each time before decanting. The precipitate is then transferred to the filter and washed with cold water, using four fillings of the filter. The filter and precipitate are then returned to the flask and the precipitate is dissolved in a small excess of a standard alkali (for example KOH). The quantity of alkali required is noted for purposes of subsequent calculations. A few drops (about 3) of phenolthalein are added and the solution is titrated with a standard acid (for example $HNO_3$) to the end point. The volume of acid required is noted.

The orthophosphate content is then determined on a percentage basis by the following computation.

A = Volume of standard base
B = Normality of standard base
C = Volume of standard acid
D = Normality of standard acid
S = Weight of that portion of the sample that is in the aliquot $$\frac{[(A \times B) - (C \times D)] \times .0030865 \times 100}{S} = \% \text{ ortho } P_2O_5$$

If for example a 1-gram sample was taken and treated in the above described manner and a 25-ml. aliquot was obtained and the normality of the standard base was 0.3240 and the normality of the standard acid was 0.1620 and the volume of the titrents was 35.00 ml. for the base and 4.00 ml. for the acid, then the calculation would be as follows:

$$\frac{[(35.00 \times .3240) - (4.0 \times 0.1620)] \times .0030865 \times 100}{0.1}$$

$$= 33.00 \text{ ortho } P_2O_5$$

The total $P_2O_5$ was determined according to the procedure set out in 2.026 of the AOAC *Methods of Analysis*, 10th edition.

The percent nonortho $P_2O_5$ was reported as a percent of the total $P_2O_5$ in the sample. If the total $P_2O_5$ in the sample is 60% and the ortho $P_2O_5$ is 33 percent as illustrated then the nonortho $P_2O_5$ would be 27 percent of the sample; 60 − 33=27. Therefore, 27/60×100 equals 45 percent polyphosphate or nonortho $P_2O_5$. Thus 45 percent of the total $P_2O_5$ present in the sample would be in the polyphosphate form.

The citrate insoluble phosphate is to be understood for purposes of this specification and the claims to be as determined according to the analytical procedure described in *Methods of Analysis* AOAC, 10th edition, 1965, procedure 2.032 and the available phosphorus according to procedure 2.035. The following examples describe without limiting the invention.

EXAMPLE 1

In practicing the process to produce a 12 percent nitrogen 58% $P_2O_5$ phosphoric acid solid (percent by weight), in a preferred manner, in the apparatus shown diagramatically in FIG. 1, a 54 percent $P_2O_5$ merchant grade wet process phosphoric acid was loaded into the feed tank 48 from which it flowed by gravity through the valve 49 and the feed in piping section 24 to pump 50. Pump 50 pumped the phosphoric acid solution through the conducting means all the way to the spray nozzle 66.

The pump fed the 0–54 (0=% N concentration and 54=% $P_2O_5$ concentration by weight) phosphoric acid at the rate of about 25 lb. per minute into the conducting means. The phosphoric acid solution entered the acid heater 53 at substantially the ambient temperature.

In this instance the ambient temperature was about 70°–100° F. The acid heater 53 was selected so that after the apparatus 10 was on stream the acid heater raised the temperature of the phosphoric acid to about 230°–275° F. From the heater the preheated 0–54 phosphoric acid flowed to the ammoniation section 34 of the apparatus where ammonia nozzle 56 introduced anhydrous ammonia as a gas at the rate of about 3.5 pounds per minute into the preheated phosphoric acid. The reaction of ammoniation raised the temperature of the acid to about 450°–550° F. The hydrostatic pressure provided by piping section 15 was about 30–60 p.s.i.

The ammoniated phosphoric acid was forced upwardly through piping section 65 and flowed downwardly to the spray nozzle 66 from which it sprayed through an airgap to the catch bowl or basin 69. As the acid passed through the airgap it was dehydrated. The dehydration was accompanied by a temperature drop of about 100° F. The water vapor yielded by the dehydration escaped from the flash chamber through the opening 70.

After dehydration the ammonium phosphate product melt fell into the collection bowl 69 and flowed as a melt into piping 72 which fed the melt into the pug mixer 76.

Product fines were delivered to the pug mixer 76 simultaneously with the fed in of the melt from piping 72. The product fines were fed into the pug mixer by the bucket conveyor 77 at the rate of about 2 to 3 times the rate at which the melt flowed into the pug mixer on a weight basis. The pug mixer was a standard twin shaft pug mill or plunger. The blades mixed, beat, flailed and worked the fines and melt together while advancing the material from the inlet end to the discharge end of the pug mixer. The average retention time of the material in the pug mixer was approximately 1 minute. The material flowed from the pug mixer as hard solid granules with a temperature substantially less than 250° F. The average length of time required for the material to pass from the beginning of the ammoniation section 34 through the pug mixer was less than approximately 5 minutes.

The material flowed from the pug mixer 76 onto a weigh belt, which weighed and transferred it to the bucket elevator 81. The bucket elevator 81 deposited the material on a set of vibrating screens 82 which sized the material between fines, oversized and product. The fines were fed by the bucket elevator 77 to the pug mixer as recycle. The fines entered the pug mixer at approximately ambient temperature. The oversize would normally be supplied to a mill which would grind the oversize and return the oversize as recycle with the fines.

The product sized granules flowed from the screens 82 into the surge hopper 84 which discharged onto the vibrator 85 feeding into the rotary cooler 86. The rotary cooler 86 cooled the granules to approximately 140°–160° F. and deposited the cooled granules on the weigh belt 87. The weigh belt 87 delivered the granules to the bucket elevator 88 which transferred the granules to a storage pile 89.

While the quantity of dust created by the cooler was not excessive it might be desirable in some instances to use a cyclone-type dust system 90 to evacuate air and dust from the cooler. The dust could then be separated and fed to conveyor 84 with the fines as recycle.

A scrubber 92 might also be employed in which case the dehydration chamber would be closed and the steam would be drawn out of the flash tank by the fans 96. The gases in the pug mixer and the cyclone dust system might also be drawn into the scrubbing tower 99 as diagramatically illustrated in FIG. 1. The vapors would be drawn into the bottom of the tower where they would be washed by the downwardly falling phosphoric acid fed through line 97. The gaseous material that was not scrubbed would be propelled outwardly through a stack by the fans 96. The scrubbing medium, in this case phosphoric acid, would be fed back into the pipeline 51 upstream of the heater 53 as shown in FIG. 1.

The product was analyzed and had an analysis of 10.4–12.3 nitrogen and 57.4–58.9 $P_2O_5$. The phosphate was 12.0–30.5 percent polyphosphate, 99.96–99.72 percent citrate soluble and 91.2–91.6 water soluble. The product was observed to be nonhygroscopic for periods of 8 weeks.

EXAMPLE 2

The equipment and procedure of Example 1 were used except the melt was collected without granulation through conduit 99 and analyzed as follows. The material was a hard material. It was observed to be nonhygroscopic for periods of 8 weeks. The product has a nitrogen content of 12.—=30.percent polyphosphate, 99.96–99.72 percent citrate-soluble and 91.2–91.6 water soluble. The product was water-soluble.

EXAMPLE 3

In practicing the process to produce a wet process phosphoric acid stabilized against the formation of a hard precipitate, 200 grams of 54 percent phosphoric acid was added to a 250 ml. beaker. The acid analyzed 1.36 percent $Fe_2O_3$ which was equivalent to 0.951 percent Fe. The acid was heated to 140° F. and stirred with a magnetic stirring bar. 1.270 grams of technical grade iron metal filings was added to the acid and the stirring continued for about 1 hour until all the metallic iron dissolved.

A blank of the 54 percent phosphoric acid was handled in the same manner without the addition of iron.

Both the processed phosphoric acid and the blank were then transferred to 1¼-inch by 4-inch styrene vials and allowed to sit for 1 month at room temperature.

After one month the blank had 1 mm. of settled solids which were hard and not easily dispersed. The processed phosphoric acid had 3 mm. of settled solids which were soft and easily dispersed.

EXAMPLE 4

In practicing the process to produce a 3 percent nitrogen 54 percent $P_2O_5$ phosphoric acid liquid (percent by weight), in a preferred manner, in the combination of apparatus shown diagrammatically in FIG. 2, a 54 percent $P_2O_5$ merchant grade wet process phosphoric acid was loaded into the feed tank 120 from which it flowed by gravity through the valve 121 and the feed in piping section 112 to pump 122. Pump 122 pumped the phosphoric acid through the conducting means 110 all the way to the spray nozzle 128.

The pump fed the 0–54 (0%= N concentration and 54%=$P_2O_5$ concentration by weight) phosphoric acid at the rate of about 230 lbs. per minute into the conducting means 110. The phosphoric acid entered the heat exchanger 124 at substantially the ambient temperature.

In this instance the ambient temperature was about 60°–80° F. The dehydrator 124 was selected so that after the apparatus 109 was on stream the heat gained from the outgoing hot-concentrated phosphoric acid rose to about 140° to 180° F. The partially preheated phosphoric acid then passed through the hose 125 to the heater 126 where it was brought into thermal contact with steam and the temperature was raised to about 220°–250° F. From the heater the preheated 0–54 phosphoric acid solution flowed to the ammonia introducing section 14 of the apparatus where ammonia nozzle 131 introduced 82 percent anhydrous ammonia as a gas at the rate of about 8.4 pounds per minute into the preheated phosphoric acid. The reaction of ammoniation raised the temperature of the acid solution to about 340°–360° F. which was above the boiling temperature. The hydrostatic pressure provided by piping section 115 was about 30–60 p.s.i.

The ammoniated phosphoric acid was forced upwardly through piping section 115 and flowed downwardly to the spray nozzle 128 from which it sprayed through an airgap to the catch bowl or basin 139. As the acid passed through the airgap it was dehydrated, giving up water which resulted in its reconcentration from its ammonia diluted form to a 3–54 (nitrogen-phosphorus) acid. The acid also came into contact with the mild steel walls of the dehydration chamber as it passed through the chamber and was treated thereby. The dehydration was accompanied by a temperature drop of about 100° F. This was an important factor in removing heat from the acid and the temperature of the ammoniated acid as it entered the piping 141 was from about 225°–240° F. The water vapor yielded by the dehydration escaped from the dehydration chamber through the opening 140.

After dehydration the phosphoric acid fell into the collection bowl 139 and flowed into piping 141 which feeds into heat exchanger 124. As the phosphoric acid passed through the heat exchanger 124 it lost heat to the incoming 0–54 acid solution, which is at about ambient temperature which may average about 30°–90° F. A temperature of from about 180°–200° F. was obtained by the time the phosphoric acid solution passed out of the heat exchanger.

The 3–54 acid solution flowed from the heat exchanger through hose 42 to the cooler 53 where it was brought into thermal contact with cooling water. The cooling water was at from about 55°–78° F. when it was fed into the cooler and it flowed from the the cooler at from about 120°–150° F. The 3–54 acid solution flowed from the cooler at from about 150°–165° F.

The acid flowed from the cooler into piping 46 which fed into a collection tank 47. From the collection tank the 3–54 acid solution flowed through piping 48 and valve 49 out the outlet 51 into the insulated railroad tank car 50. When the acid flowed into the insulated railroad tank car it was at from 150°–165° F. and substantially free of polyphosphates. The tank car was sealed and the acid was shipped about 1,000 miles. Between the time of loading and unloading about 4 weeks elapsed. The insulated tank car allowed the acid to slowly cool to about 80° F. No precipitation was visible in the tank car when it was unloaded.

Of course, as has previously been pointed out acid treated by the above process is extremely stable without being shipped in the hot condition but it is believed that hot shipping is a very valuable adjunct to further reduce precipitation. The insulated tank car may help in preventing the forming of a precipitate by preventing rapid fluctuations in temperature as well as keeping the solution hot for a longer time. An uninsulated railroad tank car was also loaded with the treated acid solution. The distance shipped and the time required for shipment were substantially the same as those for the insulated tank car. The precipitate was less than 1 percent and in fact less than 0.1 percent. It was about 1,000 pounds in a 109,000-pound shipment.

It has been observed that the pH of the acid solution remains below 1, in a pH range between about 0.05 and 0.5. The product was very fluid and free flowing at about 70° F. The citrate insoluble phosphorus content of the product process was found to be about 0.04 percent by weight.

EXAMPLE 5

The equipment and procedure of Example 4 were used, except the untreated phosphoric acid was an 0–52.5 acid, the acid was heated to about 300°–340° F. before ammoniation and the ammonia was added at the rate of about 10.3 pounds per minute. The product obtained was free flowing at about 70° F. and had an analysis of 3.7–56.3 (N—$P_2O_5$). It can be seen that the $P_2O_5$ concentration of the treated acid was about 4 percent higher than the concentration of the untreated acid. The product remained substantially free of precipitation for a period of 8 weeks.

EXAMPLE 6

The equipment and procedure of Example 4 were used, except a 316 stainless steel dehydration chamber was used in place of the mild steel dehydration chamber and the phosphoric acid was therefore not treated with iron. The untreated phosphoric acid was an 0-53.3 acid, the acid was heated to about 300°-340° F. before ammoniation and the ammonia was added at the rate of about 10.3 pounds per minute. The product obtained was free flowing at about 70° F. and had an analysis of 3.3-54.5 (N—$P_2O_5$). It can be seen that the $P_2O_5$ concentration of the treated acid was about 2.2 percent higher than the concentration of the untreated acid.

EXAMPLE 7

The following procedure was carried out in the reaction bomb previously described.

Five hundred gms. of wet process orthophosphoric acid analyzing about 54 percent $P_2O_5$ was heated to 250° F. under 20 p.s.i.g. pressure in the pressure bomb. About 29 gm. of liquid anhydrous ammonia was added to the acid at the rate of about 0.2 moles/min., taking a total of about 9 minutes for the addition, providing a N:$P_2O_5$ weight ratio of about 1:11.3. The temperature rose immediately upon addition of ammonia. After 60 seconds had elapsed, the temperature was 300° F. and a distillate appeared at the back pressure valve, still set at 20 p.s.i.g. After 5 minutes, reaction temperature was 330° F., after 9 minutes the temperature was 332° F. The total distillate volume was 128 ml. The reaction product was allowed to cool in the bomb before removal. The product was a dark liquid which flowed easily.

The liquid product had a specific gravity of 1.668 and flowed and poured easily. The liquid was allowed to rest undisturbed for 1 month, and no sediment was found to have been deposited from the stabilized phosphoric acid product. The product analyzed 4.5 percent nitrogen, total $P_2O_5$ 53.2 percent, citrate soluble $P_2O_5$ 53.19 and nonortho $P_2O_5$ 2.9 percent.

EXAMPLE 8

The equipment and procedure of Example 7 were used, except that about 22 gm. of ammonia was added at a rate of 0.09 moles per minute, providing a N:$P_2O_5$ weight ratio of about 1:15.6. To prevent acid foaming, 0.5 gm. of antifoam agent (sodium salt of a sulfonic acid) was added. The temperature rose rapidly to 338° F. The product obtained was a liquid, having a specific gravity of 1.760. No deposit was observed in an undistrubed sample of the liquid after 1 month. The product analyzed 3.5 percent nitrogen, total $P_2O_5$ 56.3 percent, citrate soluble $P_2O_5$ 56.2 percent and nonortho $P_2O_5$ 0.2 percent.

EXAMPLE 9

The equipment and procedure of Example 7 were used, except that about 48 gm. of ammonia was added at a rate of 30 grams per minute, providing a N:$P_2O_5$ weight ratio of about 1:6.8. To prevent acid foaming, 0.5 grams of antifoam agent (sodium salt of a sulfonic acid) was added. The temperature rose to 570° F. The product obtained was a solid greenish material, which was hygroscopic under ambient conditions in the laboratory, having a specific gravity of 1.760. The product analyzed 9.1 percent nitrogen, total $P_2O_5$ 64.1 percent citrate soluble $P_2O_5$ 56.5 percent and a nonortho $P_2O_5$ 40.5 percent of the total phosphate content.

EXAMPLE 10

The procedure of Example 7 was followed, except that the acid was preheated to 307° F. at 62 p.s.i.g. pressure before the ammonia was added. Total ammonia added was about 53 gm. at a rate of 0.36 moles per minute, providing a N:$P_2O_5$ weight ratio of about 1:6.2. Temperature rose to 550° F. The product obtained was a solid greenish material, not hygroscopic under ambient conditions. The product analyzed 9.4 percent nitrogen, total $P_2O_5$ 60.0 percent, citrate soluble $P_2O_5$ 65.2 percent and nonortho $P_2O_5$ 21.7 percent.

While in accordance with the patent statutes, I have described what at present is considered to be the preferred embodiment of this invention, it will be obvious to those skilled in the art that various changes and modifications may be made therein without departing from the present invention, and I, therefore aim in the following claims to cover all such equivalent variations as fall within the true spirit and scope of this invention.

I claim:

1. A process for preparing an ammonium polyphosphate product which comprises:
   a. continuously heating a flowing stream of an aqueous solution of orthophosphoric acid to a temperature of about 200°-400° F. under a superatmospheric pressure sufficient to prevent boiling thereof;
   b. continuously combining said heated phosphoric acid with a stream of ammonia in an elongated reaction zone under autogenous cocurrent reaction conditions to produce a reaction mixture having a temperature of 350°-600° F.; and
   c. continuously discharging said reaction mixture from said reaction zone into a zone at atmospheric pressure thereby to vent steam from the reaction mixture, whereby it is rapidly cooled, followed by further cooling the product down to a temperature below about 350° F. within about 10 minutes after ammoniation, so as to continuously produce an ammonium polyphosphate product which contains about 5 to 65 percent by weight of the phosphate therein in polyphosphate form; the said phosphoric acid and ammonia being combined in amounts to provide a reaction mixture containing a ratio of N—$P_2O_5$ of about 1:5 to about 1:16.

2. The method of claim 1 wherein said phosphoric acid solution contains 52 to 54 percent by weight $P_2O_5$.

3. The method of claim 1 wherein said phosphoric acid solution is heated to a temperature of 230°-350° F.

4. The method of claim 1 wherein the pressure of 1-60 p.s.i. is maintained over said heated phosphoric acid.

5. The method of claim 1 wherein the reaction mixture of step (b) achieves a temperature of 450°-550° F. and is maintained under a superatmospheric pressure of 5-75 p.s.i.

6. The method of claim 1 wherein said cooling step (c) produces a temperature drop in said reaction mixture of about 100° F.

* * * * *